United States Patent
Altmann

(10) Patent No.: US 7,641,337 B2
(45) Date of Patent: Jan. 5, 2010

(54) OPHTHALMIC LENS INCLUDING PHOTOCHROMIC MATERIAL

(75) Inventor: Griffith E. Altmann, Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 41 days.

(21) Appl. No.: 11/615,491

(22) Filed: Dec. 22, 2006

(65) Prior Publication Data

US 2008/0151183 A1 Jun. 26, 2008

(51) Int. Cl.
G02C 7/10 (2006.01)

(52) U.S. Cl. ............... 351/165; 351/161; 351/168; 623/4.1

(58) Field of Classification Search ......... 351/159–177; 623/4.1–6.55
See application file for complete search history.

(56) References Cited

U.S. PATENT DOCUMENTS

| | | | |
|---|---|---|---|
| 4,286,957 A | 9/1981 | Le Naour-Sene | |
| 4,614,530 A * | 9/1986 | Sukkar | 65/30.11 |
| 4,929,693 A | 5/1990 | Akashi et al. | |
| 4,955,904 A | 9/1990 | Atebara et al. | |
| 4,976,732 A | 12/1990 | Vorosmarthy | |
| 5,074,942 A | 12/1991 | Kearns et al. | |
| 5,080,688 A | 1/1992 | Cohen | |
| 5,108,427 A | 4/1992 | Majercik et al. | |
| 5,166,345 A | 11/1992 | Akashi et al. | |
| 5,298,033 A | 3/1994 | Hung et al. | |
| 5,531,940 A | 7/1996 | Gupta et al. | |
| 5,662,706 A | 9/1997 | Legerton et al. | |
| 5,730,911 A | 3/1998 | Cano et al. | |
| 5,786,883 A | 7/1998 | Miller et al. | |
| 5,789,015 A | 8/1998 | Gupta et al. | |
| 5,891,585 A | 4/1999 | Ayai et al. | |
| 5,914,174 A | 6/1999 | Gupta et al. | |
| 5,936,016 A | 8/1999 | Lareginie et al. | |
| 6,017,121 A | 1/2000 | Chateau et al. | |
| 6,174,464 B1 | 1/2001 | Garrity | |
| 6,224,945 B1 | 5/2001 | Calderara | |
| 6,855,163 B2 * | 2/2005 | Peyman | 623/5.11 |
| 2003/0142267 A1 | 7/2003 | Gemert et al. | |
| 2007/0052922 A1 * | 3/2007 | King et al. | 351/168 |
| 2008/0002147 A1 * | 1/2008 | Haywood et al. | 351/160 R |

FOREIGN PATENT DOCUMENTS

| | | |
|---|---|---|
| EP | 1674049 A1 | 6/2006 |
| WO | WO 2004/105588 A2 | 12/2004 |
| WO | WO 2006/047534 A1 | 5/2006 |
| WO | WO 2006/060380 A2 | 6/2006 |
| WO | WO 2006/113377 A2 | 10/2006 |
| WO | WO 2006/113411 A1 | 10/2006 |
| WO | WO 2007/057734 A2 | 5/2007 |

OTHER PUBLICATIONS

Hecht, "Aberrations," Optics, Chapter 6.35/1990, 2nd ed., Addison-Wesley Pub. Co., (p. 220-237).

* cited by examiner

Primary Examiner—Darryl J Collins
(74) Attorney, Agent, or Firm—Jeffrey B. Powers

(57) ABSTRACT

An ophthalmic lens, comprising an optic including at least one photochromic region having a first chromaticity and a second region of lesser photochromaticity. A method of treating a subject having presbyopia or aniridia comprising applying to the subject's eye an ophthalmic lens comprising an optic including at least one photochromic region having a first chromaticity and a second region of lesser photochromaticity.

27 Claims, 6 Drawing Sheets

OPHTHALMIC LENS INCLUDING PHOTOCHROMIC MATERIAL

FIELD OF INVENTION

The present invention relates to ophthalmic lenses and methods of treatment using the same, and more particularly to ophthalmic lenses including a photochromic material.

BACKGROUND OF THE INVENTION

Presbyopia, the inability to attain accommodative vision, is an affliction of a large percentage of persons over forty years of age. The likelihood of a person developing presbyopia increases with age until the age of fifty where nearly all persons will be presbyopic.

Known techniques for mitigating the affects of presbyopia include the use of an ophthalmic lens having a pinhole. Such lenses take advantage of a well-known optical effect to achieve increased depth of field of an optical system, by reducing the size of the aperture of the lenses and therefore the aperture of an eye is limited when such a lens is located on an eye.

A tradeoff of using a pinhole in an eye is that depth of field is increased at the expense of reduced image brightness.

SUMMARY

Aspects of the present invention are directed to ophthalmic lenses comprising an optic including a photochromic region and a region of lesser photochromaticity, thereby providing an aperture of variable diameter along at least some cross sections of the lens. Along the cross sections a relatively smaller aperture is provided in times of high brightness, and a relatively larger aperture is provided in times of low brightness.

In some embodiments, the region of lesser photochromaticity is a non-photochromic region. In some embodiments of lenses, the region of lesser photochromaticity is at least partially surrounded by the photochromic region.

Embodiments of lenses according to the present invention are capable of providing a wearer with a relatively small aperture (i.e., a larger depth of field) when the tradeoff associated with having a small aperture present in the eye is advantageous to a wearer's seeing ability. The embodiments are also capable of providing a wearer with a relatively large aperture when the tradeoff associated with having a small aperture present in the eye is disadvantageous to a wearer's seeing ability.

Aspects of the invention are directed to an ophthalmic lens, comprising an optic including at least one photochromic region having a first chromaticity and a second region of lesser photochromaticity. In some embodiments, the at least one photochromic region surrounds the second region. The second region may be circular. The second region may have a radius r, where $0.5 \leq r \leq 1.5$ mm.

In some embodiments, the lens is multifocal. The second region may be multifocal. In some embodiments, the photochromic region comprises a broadband photochromic material for visible light. In some embodiments, the photochromic region comprises a neutral density photochromic material for visible light. In other embodiments, the photochromic region may comprise a photochromic material that is a low pass filter of visible light, a high pass filter of visible light, a band pass filter of visible light, or a notch filter of visible light.

The second region may have a concentration of chromophores that is uniform as a function of radial position or a concentration of chromophores that varies as a function of radial position. In some embodiments, the second region has a concentration of chromophores that varies linearly as a function of radial position.

The optic may comprise at least two photochromic regions having a first chromaticity. In some embodiments, the second region has substantially no chromophores. The photochromic region may substantially surround the second region. The photochromic region may be disposed around 270 degrees of the 360 degrees of the second region.

The second region may be on axis. The lens may be an intraocular lens, a contact lens or a corneal inlay or a corneal onlay. The lens may have optical power or no optical power.

Another aspect of the lens is directed to an ophthalmic lens comprising an optic including at least one photochromic region that substantially surrounds a non-photochromic region.

Another aspect of the invention is directed to method of treating a subject having aniridia, the method comprising applying to the subject's eye an ophthalmic lens comprising an optic including at least one photochromic region having a first chromaticity and a second region of lesser photochromaticity.

Yet another aspect of the invention is directed to a method of treating a subject having presbyopia, the method comprising applying to the subject's eye an ophthalmic lens comprising an optic including at least one photochromic region having a first chromaticity and a second region of lesser photochromaticity.

BRIEF DESCRIPTION OF THE DRAWINGS

Illustrative, non-limiting embodiments of the present invention will be described by way of example with reference to the accompanying drawings, in which the same reference number is used to designate the same or similar components in different figures, and in which.

DETAILED DESCRIPTION

Figure 1A:
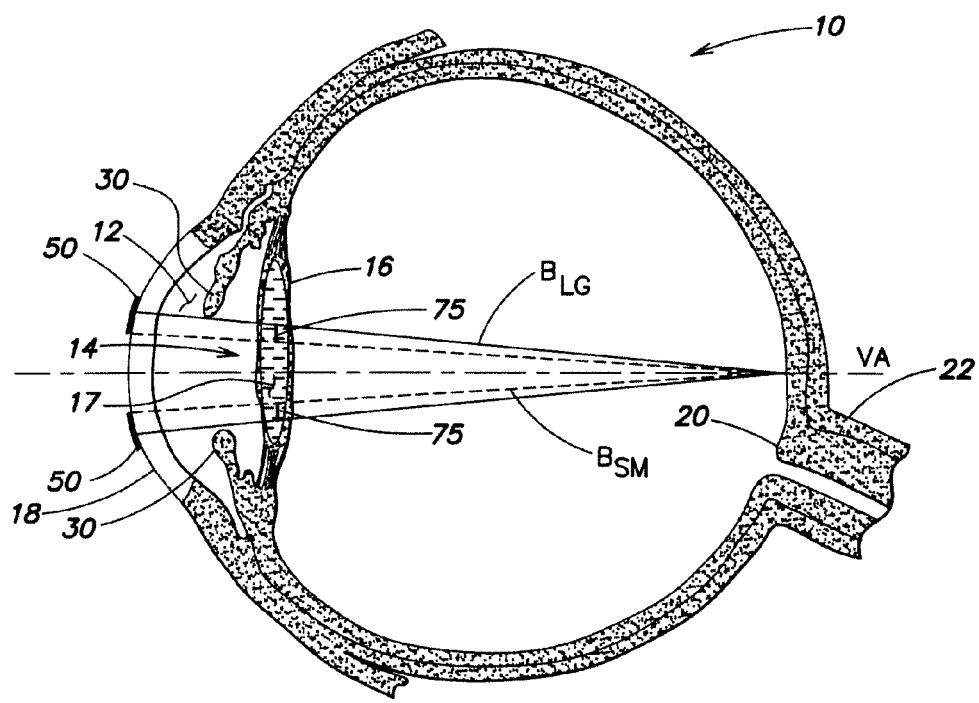
FIG. 1A is a schematic cross sectional illustration of an eye illustrating a bundle of rays transmitted through an eye.

FIG. 1A is a schematic cross-sectional illustration of an eye 10 illustrating bundles of rays $B_{LG}$ and $B_{SM}$ transmitted through the eye. Eye 10 has an anterior chamber 12 and a posterior chamber 14 separated by an iris 30. Within the posterior chamber 14 is a capsular bag 16 holding an embodiment of a lens according to aspects of the present invention. Light enters the eye by passing through cornea 18. The cornea and lens 17 act together to transmit and/or focus the light onto retina 20. The retina is connected to optic nerve 22 which transmits images received by the retina to the brain for interpretation. Eye 10 has a visual axis VA that extends along the optical axis of the lens and cornea to the fovea (not shown) of the retina.

Bundle of rays $B_{LG}$ illustrates the bundle of rays that would be transmitted through the eye in the absence of any artificial aperture in the eye. That is, bundle of rays $B_{LG}$ is limited by the eye's iris 30. According to aspects of the present invention, an eye is provided with an ophthalmic lens in capsular bag 16 having a photochromic region 75 that, in at least one state, transmits to the retina 20 only a portion of light in a region between bundle $B_{SM}$ and bundle $B_{LG}$. In other states, the photochromic region allows a greater portion of the light in the region between bundle of rays $B_{LG}$ and $B_{SM}$ to be transmitted to the retina. In some embodiments, in at least one state, substantially all visible light (i.e., >95%) that is in the region between bundle $B_{SM}$ and bundle $B_{LG}$ is blocked, and in a second state substantially all (i.e., >95%) of the visible light in the region between bundle $B_{SM}$ and bundle $B_{LG}$ is transmitted. According to other aspects of the lens, as an alternative to a lens in the capsular bag, an eye may be provided with a lens at the cornea having a photochromic region 50 to limit the bundle of light transmitted to the retina.

Figure 1B:
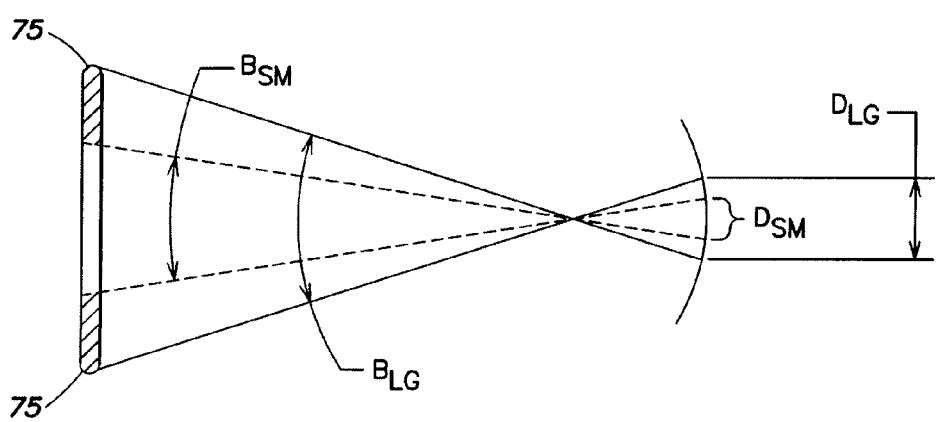
FIG. 1B is a schematic illustration a bundle of rays that is defocused on the retina of the eye.

FIG. 1B is a schematic illustration of a bundle of rays that is defocused on the retina of they eye. Such defocus may, for example, be the result of a subject's presbyopic condition when looking at a near object. It will be appreciated that by limiting the bundle of rays to a cone $B_{SM}$, the light on the retina will be limited to a blur diameter $D_{SM}$ and the effects of the defocus will be reduced. It will be appreciated that in the absence of a photochromic region, a bundle of light $B_{LG}$ having a blur diameter $D_{LG}$ would be incident on the retina. As discussed above, a portion of the light in the region between $B_{SM}$ and $B_{LG}$ may be selectively transmitted or blocked depending on the brightness of a wearer's surrounding. It will be appreciated that the amount of light that is transmitted will be dependent on the brightness of the wearer's surroundings, and a continuous variation from substantially complete blocking to substantially complete transmission may be achieved.

Figure 2A:
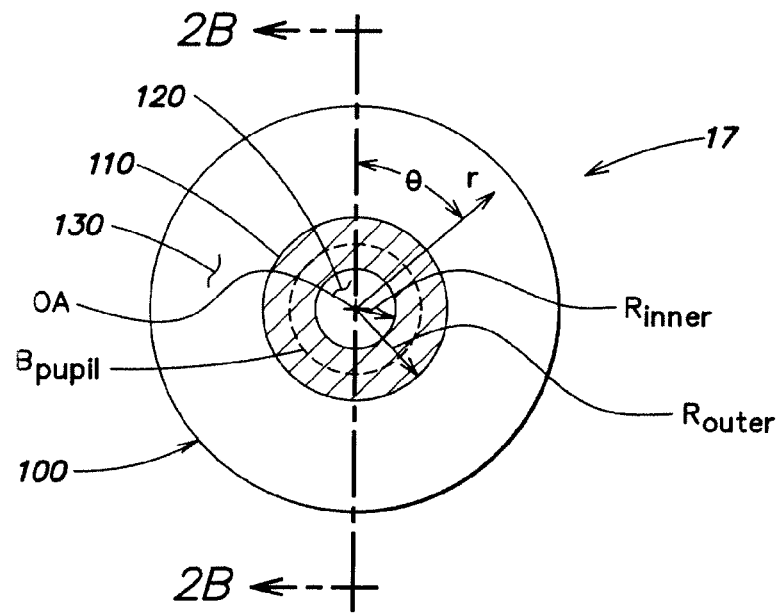
FIG. 2A is a plan view of a first example of an embodiment of a ophthalmic lens according to aspects of the invention.
Figure 2B:
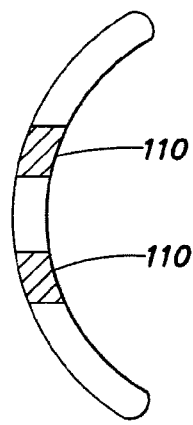
FIG. 2B is a cross sectional view of the embodiment of an ophthalmic lens illustrated in FIG. 2A taken along line 2B-2B.

FIG. 2A is a plan view of an example of an embodiment of an ophthalmic lens 17 according to aspects of the invention. The ophthalmic lens comprises an optic 100 including a photochromic region 110 that surrounds a non-photochromic region 120. The term "ophthalmic lens" as used herein refers, for example, to any of an intraocular lens (e.g., an anterior chamber or a posterior chamber IOL), a contact lens, a corneal onlay or inlay, whether it has optical power or not. A posterior chamber IOL may be located in a capsular bag, in the ciliary sulcus or in any other suitable location. FIG. 2B is a cross sectional view of the embodiment of an ophthalmic lens illustrated in FIG. 2A. It will be appreciated that some ophthalmic lenses will include one or two or more supports or fastening structures (not shown) (e.g., IOLs may have haptics and corneal inlays may have fixation holes).

The term "photochromic region" refers to a portion of the lens that includes one or more chromophores (i.e., a photochromic material). A "photochromic material" is a material that has a first transmission (e.g., the material may be transparent or substantially transparent) in relatively dim conditions and a second, lesser transmission as brightness increases.

It will be appreciated that photochromic materials typically have a spectral transmission property. Accordingly, a photochromic region will also have spectral response. For example, a given region may block substantially all light of a first wavelength and substantially no light at another wavelength. Photochromic compositions for use with embodiments of the present invention will at least partially block light in at least a portion of the visible spectrum (approximately 400 nm-700 nm). However, health advantages may be gained if a composition blocks at least some light in either the ultraviolet or infrared portions of the spectrum. A suitable spectral response for use in a given lens may be attained by using one or a plurality of chromophores.

Typically, the inner radius $R_{inner}$ of the non-photochromic region will be approximately $0.5 \leq r \leq 1.5$ millimeters (mm). In some embodiments, the inner radius is selected such that the radius of the entrance pupil of the eye generated by the ophthalmic lens, as measured by a pupilometer, will have a radius of 0.5 to 1.5 millimeters (mm). It will be appreciated that the inner radius $R_{inner}$ of the ophthalmic lens may be 0-15% smaller than the pupil measured by the pupilometer. It will be further appreciated that the inner radius $R_{inner}$ of the ophthalmic lens that is necessary to produce an entrance pupil having a radius of 0.5 to 1.5 millimeters (mm) will depend at least in part on where the ophthalmic lens is to be located relative to the eye (e.g., it will depend on whether the lens is contact lens, an IOL, a corneal onlay or a corneal inlay).

For embodiments in which the photochromic region is designed to have substantially zero transmission, vision of a patient's eye will be through a pinhole determined by radius r. It will be appreciated that for pinholes giving rise to an entrance pupil that is smaller than 0.5 mm, diffraction effects and lack of sufficient light will typically cause a degradation in vision. While the above typical radius dimension has advantages, it is to be understood that some embodiments of the invention may give rise to an entrance pupil that is greater or lesser than the above typical dimensions.

It will also be appreciated that minimum pupil size varies throughout the patient population. It may be advantageous if a patient having a relatively large pupil is prescribed a lens having a relatively large inner radius, and a patient a having relatively small pupil is prescribed a lens having a relatively small inner radius.

The outer radius of the photochromic region may extend to the edge of the ophthalmic lens. However, in some embodiments, it is advantageous if the photochromic region has an outer radius $R_{outer}$ that is less than the radius of the entire lens. For example, so limiting the outer radius may provide advantages for a patient's peripheral vision and may provide advantages for post-operative eye examinations. In such lenses, a non-photochromic region 130 (or a region of less photochromaticity) may exist in the outer portions of the lens. For example, the outer radius $R_{outer}$ may be 2-3 mm. It may be advantageous in embodiments, in which the inner radius is about 0.5 mm that the outer radius be about 2 mm; and in embodiments, in which the inner radius is about 1.5 mm that the outer radius be about 3 mm.

A lens as shown in FIG. 2A is designed such that, in the brightest light condition (i.e., conditions in which the patient's pupil is fully constricted), the radius r of the bundle of light transmitted by the non-photchromic region of the lens is less than the radius of the bundle of light $B_{pupil}$ that would be transmitted by a patient's pupil (i.e., as determined by the state of the patient's iris). An advantage of aspects of the present invention is that, as conditions dim such that the pupil dilates, at least a portion of the light incident on photochromic region 110 of the lens is transmitted to the retina (in addition to the light that is transmitted through the non-photochromic regions of the lens). In such a state, the radius at which full blocking of light occurs may be determined by the patient's iris. Alternatively, a region may be provided on the lens that limits the aperture of the eye even in the when the eye is fully dilated. Such a region may include photochromic material or an opaque material.

In some embodiments, an ophthalmic lens may be provided with corrective optical power (e.g., the correct myopia or hyperopia) or no optical power. In some embodiments, the ophthalmic lens may be multifocal (e.g., bifocal or trifocal). In some embodiments, only the non-photochromic regions of the lens are multifocal. In some embodiments, it may be advantageous to provide aberration correction in the non-photochromic region and/or the photochromic region to control aberrations of the eye and/or the lens (e.g., one or more lens surfaces may be aspheric).

Figure 3:
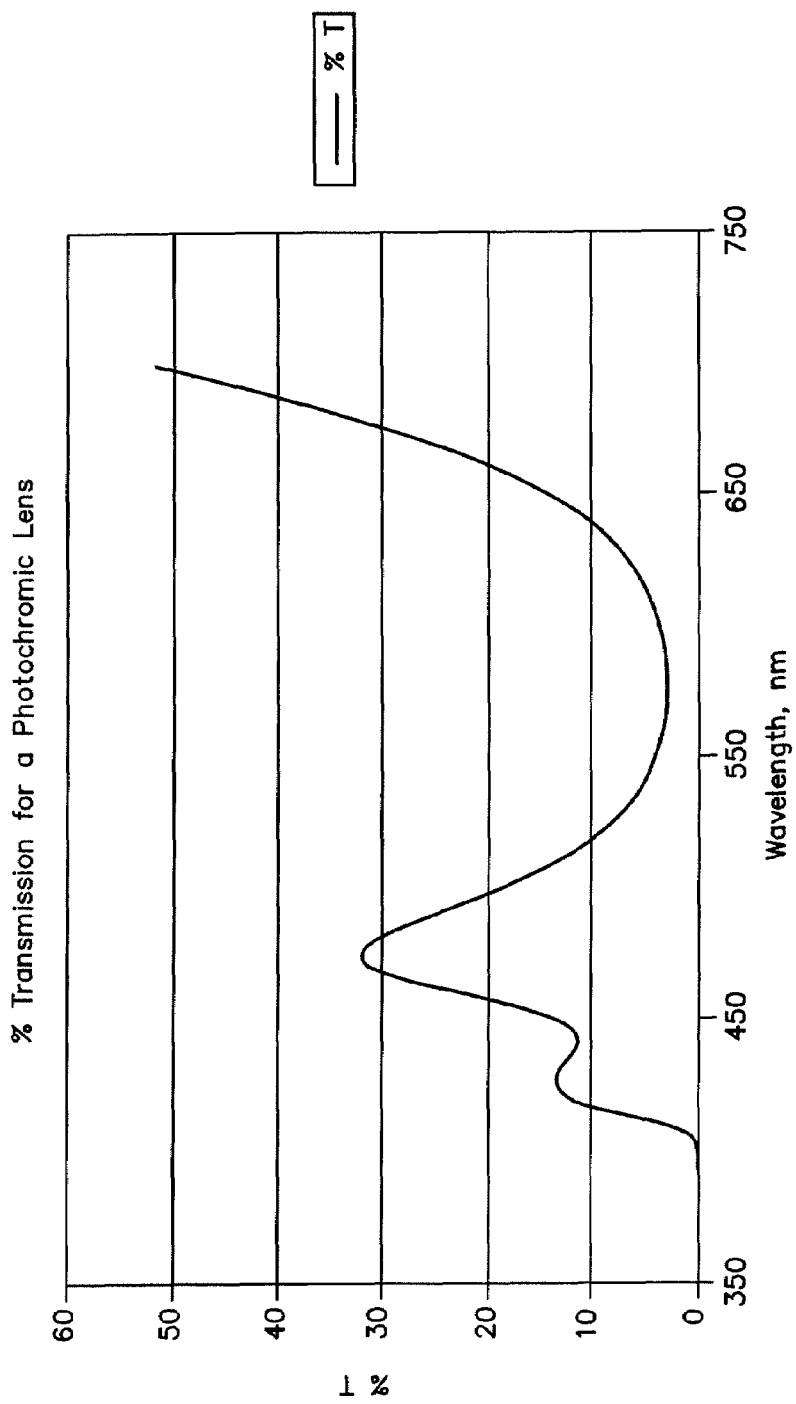
FIG. 3 is a graphical representation of transmission characteristics as a function of wavelength for an example of a broadband photochromic material suitable for use in embodiments of an ophthalmic lens according to aspects of the invention.

In some embodiments, it is advantageous if the photochromic material is broad band. A broadband photochromic material is defined herein as a material that blocks at least 50% of light for a band of at least 200 nm of the visible wavelengths at high brightness. (The band of 200 nm may be continuous in the visible band or not.). For example, Naphthopyrans such as (3H-naphtho [2,1-b]pyran, 2H-naphtho [1,2-b]pyrans may be used as broadband photochromic materials. FIG. 3 is a graphical representation of transmission characteristics as a function of wavelength, of an example of a broadband photochromic material suitable for use in embodiments of ophthalmic lens. The illustrated graphical data is for Photosol 749, PPG Industries.

In some embodiments, the broadband photochromic material may be a neutral density photochromic material that is presently known or later developed. Such neutral density materials block light nearly uniformly across at least the visible spectrum at at least some light levels. It will be appreciated that the spectral response of a given chromophore may change as a function of time of exposure to light, and as a function of the intensity of the light.

In some embodiments, a photochromic material having a non-uniform spectral response (i.e., a non-neutral density material) may provide advantages. A photochromic material may block more light in longer visible wavelengths relative to light blocked in the short visible wavelengths. That is, the photochromic material may be a low pass filter in the visible wavelengths.

Alternatively, the photochromic material may block more light in shorter visible wavelengths relative to light blocked in the longer visible wavelengths. That is, the photochromic material may be a high pass filter in the visible wavelengths. For example, in such embodiments, a blue blocker such as 3,3-dianysl-6-piperidino-3H-naphtho [2,1-b]pyran available from James Robinson Ltd or Photosol 5-3 (yellow) available from PPG Industries may be used. The high pass photochromic material may be any other suitable photochromic material that is presently known or later developed.

In yet a further alternative, the photochromic material may block more light in longer visible wavelengths and in the shorter visible wavelengths relative to light blocked in the middle visible wavelengths. That is, the photochromic material may be a band pass filter in the visible wavelengths.

In yet a further alternative, the photochromic material may block more light in the middle visible wavelengths relative to light blocked in longer visible wavelengths and in the shorter visible wavelengths,. That is, the photochromic material may be a notch filter in the visible wavelengths.

It will be appreciated that, by limiting at least a portion of the wavelengths (as the high pass filters, the low pass filter, the band pass and the notch filters would) the depth of field of a subject's eye may be increased and chromatic aberrations may be reduced. Additional advantages of limiting at least a portion of the wavelengths may include reducing the likelihood of phototoxicity which has been associated with age-related macular degeneration (AMD). Limiting short wavelengths of light is particularly effective at reducing the likelihood of developing AMD.

In addition to varying spectral response, another design variable is the ability to vary concentration of the photochromic material used in regions of the lens. It will be appreciated that, by increasing the concentration in a given location on a lens, the percentage of light that is blocked at that location will be increased.

Figure 4A:
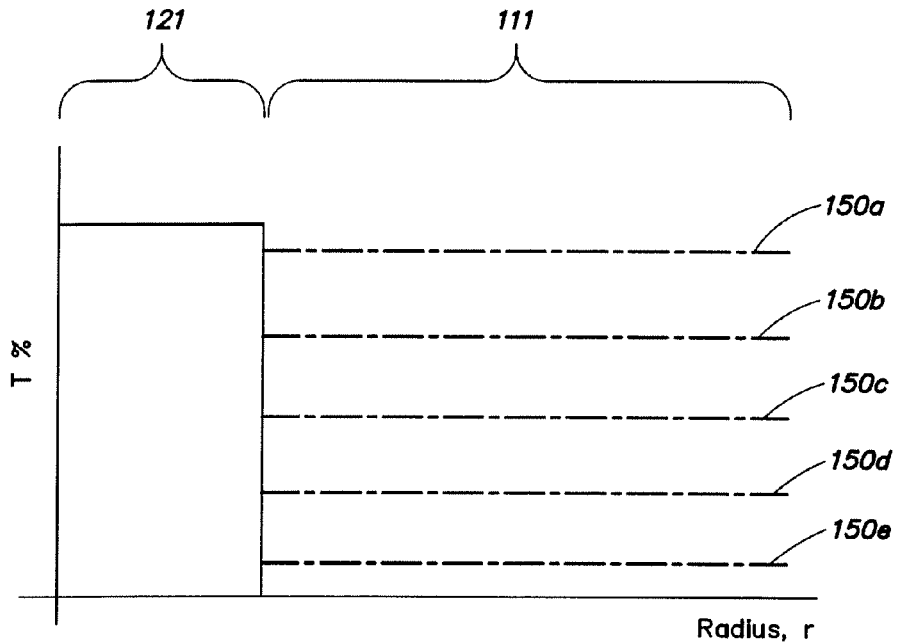
FIGS. 4A and 4B are graphical representations of examples of transmission characteristics as a function of radial position, for embodiments of ophthalmic lens according to aspects of the invention.

FIG. 4A is a graphical representation of percentage of light transmission T % as a function of radial position r (shown in FIG. 2A) for one example of an embodiment of a lens. Transmission curves 150a-150e illustrate percentage of transmission as a function of radial position r for five example levels of brightness. It will be understood that, although transmission curves for five discrete levels of brightness are illustrated, the percentage of transmission may vary continuously between the illustrated examples from opacity to full transparency.

In the illustrated embodiment, the concentration of the photochromic material is uniform at all radial distances within the photochromic region 110 (shown in FIG. 2A) as illustrated at reference number 111. Transmission is greatest in the non-photochromic region 120 (shown in FIG. 2A) as illustrated at reference number 121. The illustrated transmission curve is for a representative (i.e., single) wavelength of visible light. As was discussed above, visible light includes a band of wavelengths and transmission of a photochromic material may vary as a function of wavelength. Accordingly, although the representative wavelength has a particular transmission, it will be appreciated that other wavelengths may have different transmissions that, at a given radial position, is greater or lesser than the selected wavelength.

Although not graphically illustrated, the concentration of photochromic material in the photochromic region will typically be uniform as a function of angular position θ. However, embodiments of the present invention may have non-uniform concentration as a function of angular position.

Figure 4B:
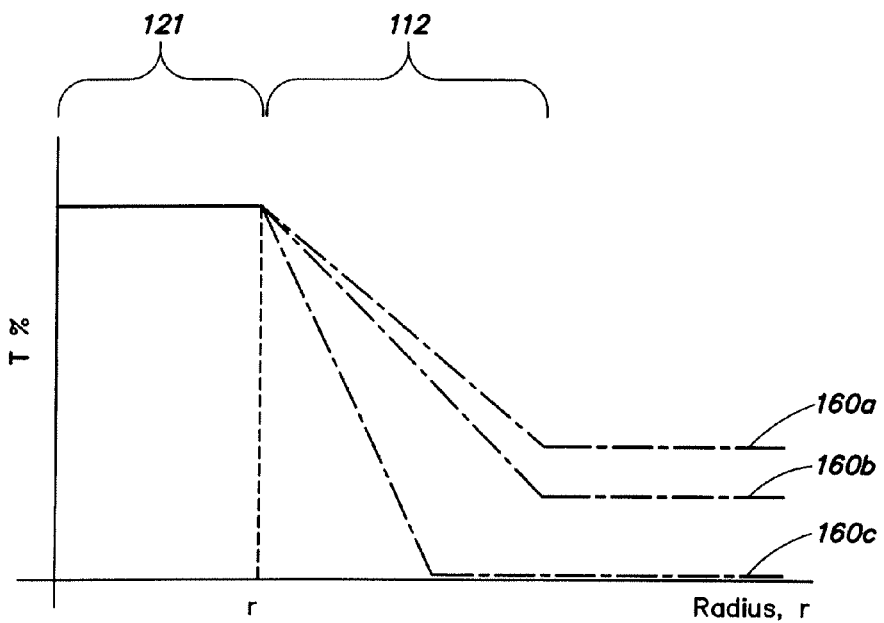

FIG. 4B is a graphical representation of percentage of light transmission T % as a function of radial position r (shown in FIG. 2A) for one example of an embodiment of a lens, in which the concentration of the photochromic material varies as a function of radial position (r). Transmission curves 160a-160c illustrate percentage of transmission as a function of radial position r for three example levels of brightness for the example embodiment. In FIG. 4B, the concentration varies linearly as function of radial position across the photochromic region 110 (shown in FIG. 2A) as illustrated at reference number 112. Transmission is greatest in the non-photochromic region 120 (shown in FIG. 2A) as illustrated at reference number 121.

It will be appreciated that one advantage of varying the concentration as a function of radius results from the fact that a subject's visual acuity is typically greater when light is limited through regions closer to the visual axis, rather than further from the visual axis. Accordingly, in some embodiments, by varying the concentration radially, a predisposition to transmit light near the visual axis can be attained. In such embodiments, light further from the visual axis is transmitted in a lesser proportion than the light nearer to the visual axis. Although in the illustrated embodiment, the concentration of the photochromic material varies linearly as a function of radial position, other suitable variations as a function of radial position are possible.

Although the above figures illustrate lenses in which the photochromic region surrounds a non-photochromic region, benefits of aspects of the present invention may be achieved in ophthalmic lenses having an optic including at least one photochromic region having a first photochromaticity and a second region of lesser photochromaticity disposed in a second region.

Figure 5A:
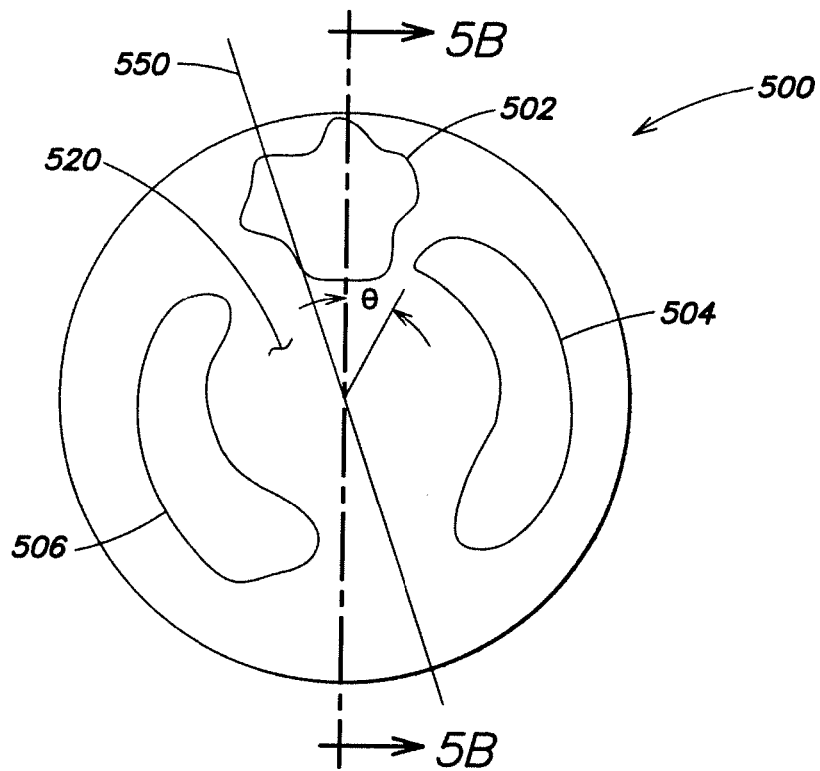
FIG. 5A is a plan view of another example of an embodiment of a ophthalmic lens according to aspects of the invention.
Figure 5B:
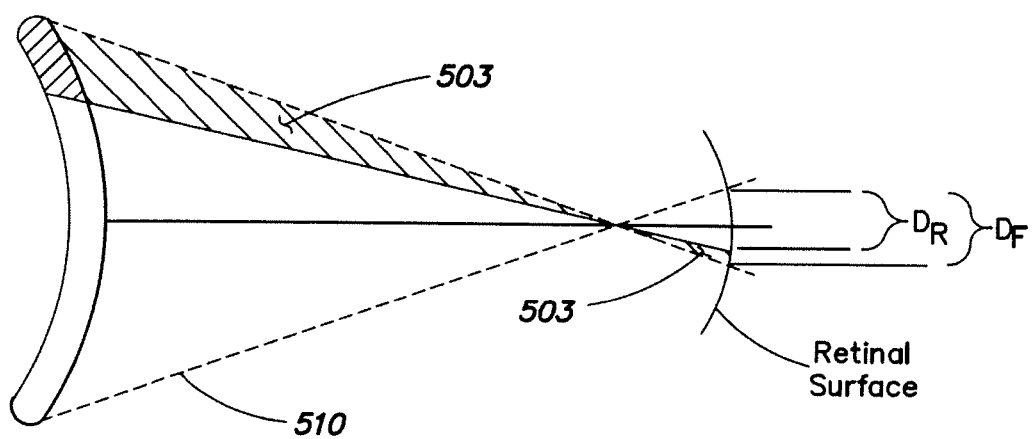
FIG. 5B is a cross sectional view of the embodiment of an ophthalmic lens illustrated in FIG. 5A taken along line 5B-5B showing a schematic illustration a bundle of rays that is defocused on the retina of an eye.

Referring to FIG. 5A, a first photochromic region 502 having a first photochromaticity is illustrated. The first photochromic region may have any suitable shape. Referring to FIG. 5B, a schematic illustration of a bundle of rays along a cross section at line 5B-5B is illustrated, and the rays are shown as defocused on the retinal surface of an eye. It will be appreciated that, as a result of being limited by first photochromic region 502, defocused light projected through line 5B-5B forms a blur at the retinal plane having a diameter $D_R$ that is decreased from the blur diameter of lens 500 $D_F$ that would result in the absence of the photochromic region 502. Accordingly, the effects of the defocus will be reduced along line 5B-5B. In the illustrated embodiment, the rays at the bottom 510 of the cross section will be limited by the wearer's iris. It will be appreciated that there would be reduction in the blur diameter for other selected other cross sections (e.g., along line 550) also. Similar to the discussion above with reference to FIG. 1B, a portion of the light in the region 503 may be selectively transmitted or blocked depending on the brightness of a wearer's surrounding.

As illustrated in FIG. 5A, in addition to the first photochromic region, one or more additional photochromic regions 504 and 506 may be included. It will be appreciated that, for each of the photochromic regions, selected cross sections will have defocused bundles of rays that, under relatively bright conditions, have reduced light transmission and may have diameters that are decreased from the bundle of rays that would pass if the lens had no such photochromic region. It will be appreciated that lens 500 includes at least one region 520 of lesser photochromaticity than first region 502. The term "region of lesser photochromaticity" means that the region has a lesser density of chromaphores than in the photochromic region or different chromaphores that transmit more light than region 502. In some embodiments, the region of lesser photochromaticity has no chromophores.

In some embodiments, it is advantageous that the optic have a photochromic region that surrounds a region of lesser photochromaticity as described above with reference to FIG. 2A. In some embodiment, it is advantageous if the photochromic region substantially surrounds the region of lesser photochromaticity. The term substantially surrounds is defined herein as covering at least 270 degrees of the 360 degrees θ around the region of lesser photochromaticity. In some embodiments, a substantially surrounding region covers at least 315 degrees; and in other embodiments at least 340 degrees.

In some embodiments, the second region may be circular. The second region may include the optical axis OA of the lens as shown in FIG. 2A (i.e., the second region is at least partially on axis). However, in some embodiments (e.g., the embodiment shown in FIG. 5), the second region is non-circular. In some embodiments, the second region is disposed in a peripheral region of a lens. The term "peripheral region" is defined herein to mean a region that does not include the optical axis.

An example of a use of ophthalmic lenses according to aspects of the present invention is in the treatment of presbyopia. It will be appreciated that embodiments of ophthalmic lenses as described herein may provide benefits when applied to a subject's eye such as one or more of (1) increasing depth of field, (2) reducing more-highly aberrated light present in regions more distal from the visual axis of the eye, (3) reducing the likelihood of phototoxicity. Applying a lens may include, for example, inserting an intraocular lens in an eye, implanting a corneal implant in or on the eye, and depositing a contact lens on the cornea of the eye.

Another example of a use of ophthalmic lenses according to aspects of the present invention is the treatment of aniridia (i.e., a condition in which a subject has no iris). It will be appreciated that embodiments of ophthalmic lenses as described herein would provide benefits when applied to such a subject's eye because the lenses transmit light in a reduced diameter in high brightness conditions and light in a larger diameter in low brightness conditions. Applying a lens may include, for example, inserting an intraocular lens into an eye, implanting a corneal implant in or on an eye, depositing a contact lens on the cornea of an eye. Embodiments in which a region of less chromaticity (e.g., a non-photochromic region) is surrounded by (or substantially surrounded by) a region of higher chromaticity are particularly suitable for such uses due to their having a shape similar to a natural iris. However, benefits may be gained from other embodiments.

Figure 6A:
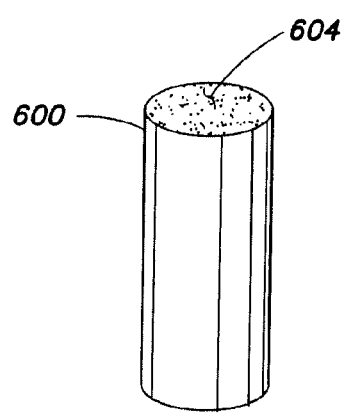
FIGS. 6A-6C illustrates examples of steps for facilitating the manufacture of embodiments of ophthalmic lenses according to aspects of the invention.
Figure 6B:
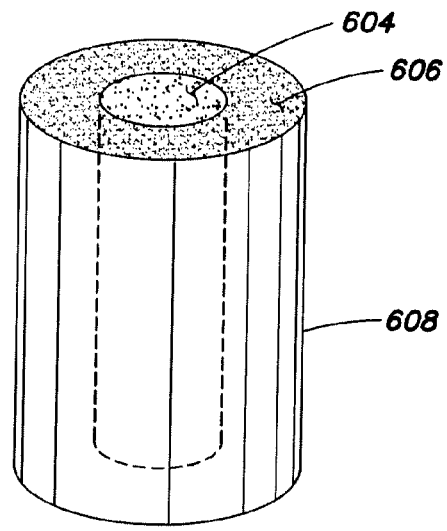
Figure 6C:
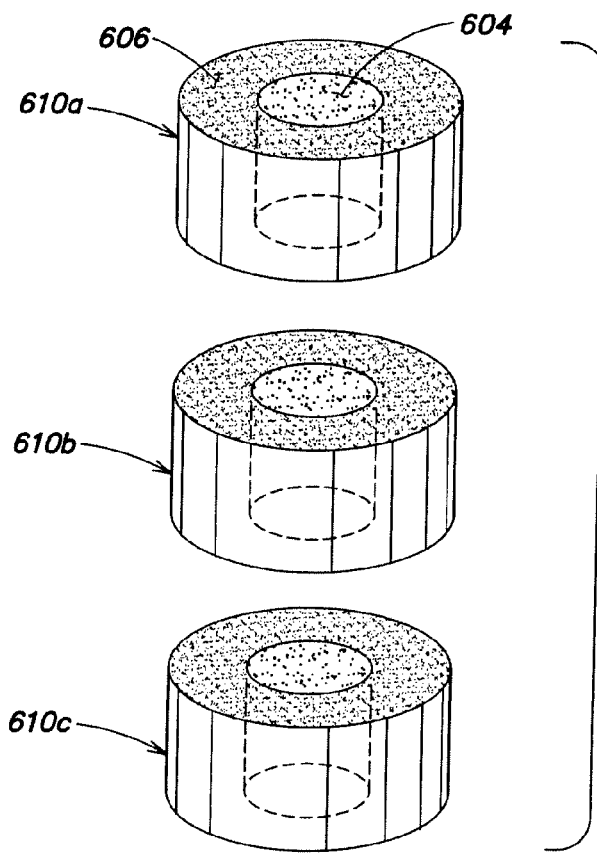

FIGS. 6A-6C illustrate examples of steps of a cold casting technique for facilitating the manufacture of examples of embodiments of ophthalmic lenses according to aspects of the invention. In FIG. 6A a mass of non-photochromic material 604 is polymerized in a first tubular structure 600. In FIG. 6B, the first tubular structure is removed and the molded mass of non-photochromic material 604 is placed in a second tubular structure 608. A mass of photochromic material 606 is added and polymerized such that molded mass of non-photochromic material and the mass of photochromic material are copolymerized together. Subsequently, the combined, polymerized mass of materials is cut into sections 610a-610c having an outer region of photochromic material 606 and a core of non-photochromic material that can be processed using any suitable technique (e.g., lathing or other machining) to form an ophthalmic lens.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and presented by way of example only. The invention is limited only as required by the following claims and equivalents thereto.

What is claimed is:

1. An ophthalmic lens having an optical axis, comprising:
   an optic including
   (i) at least one photochromic region, and
   (ii) a second region of lesser photochromaticity than the at least one photochromic region, the second region having the optical axis extending therethrough, the second region extending from the optical axis to a radius r, where $0.5 \leq r < 1.5$ mm,
   the at least one photochromic region substantially surrounding the second region, wherein the at least one photochromic region is bounded by inner and outer boundaries, the at least one photochromic region having a non-zero concentration of chromaphores at locations between the boundaries, the non-zero concentration of chromaphores varying as a function of radial position such that the at least one photochromic region transmits more light closer to the optical axis than further from the optical axis, wherein the lens is adapted to be applied to an eye and adapted to permit light to transmit through the lens to the retina when applied to the eye.

2. The ophthalmic lens in claim 1, wherein the at least one photochromic region completely surrounds the second region.

3. The ophthalmic lens in claim 2, wherein the second region is circular.

4. The ophthalmic lens in claim 1, wherein the lens is multifocal.

5. The ophthalmic lens in claim 1, wherein the photochromic region comprises a broadband photochromic material for visible light.

6. The ophthalmic lens in claim 1, wherein the photochromic region comprises a neutral density photochromic material for visible light.

7. The ophthalmic lens in claim 1, wherein the photochromic region comprises a photochromic material that is a low pass filter of visible light.

8. The ophthalmic lens in claim 1, wherein the photochromic region comprises a photochromic material that is a high pass filter of visible light.

9. The ophthalmic lens in claim 1, wherein the photochromic region comprises a photochromic material that is a band pass filter of visible light.

10. The ophthalmic lens in claim 1, wherein the photochromic region comprises a photochromic material that is a notch filter of visible light.

11. The ophthalmic lens in claim 1, wherein the second region has a concentration of chromophores that varies linearly as a function of radial position.

12. The ophthalmic lens in claim 1, wherein the optic includes at least two photochromic regions having a first chromaticity.

13. The ophthalmic lens in claim 1, wherein the second region has substantially no chromophores.

14. The ophthalmic lens in claim 1, wherein the lens is an intraocular lens.

15. The ophthalmic lens in claim 1, wherein the lens is a contact lens.

16. The ophthalmic lens in claim 1, wherein the lens is a corneal inlay or a corneal onlay.

17. The ophthalmic lens in claim 1, wherein the lens has optical power.

18. The ophthalmic lens of claim 1, wherein, the concentration of chromaphores varies continuously as a function of radial position.

19. A method of treating a subject's eye, the eye having an iris and a retina, the method comprising:
   applying to the subject's eye an ophthalmic lens having an optical axis, the lens comprising an optic including
      (i) at least one photochromic region and
      (ii) a second region of lesser photochromaticity than the at least one photochromic region, the second region having the optical axis extending therethrough, the second region extending from the optical axis to a radius r, where $0.5 \leq r < 1.5$ mm,
   the at least one photochromic region substantially surrounding the second region, wherein the lens is adapted to permit light to transmit through the lens to the retina after application to the eye.

20. The method in claim 19, wherein the at least one photochromic region completely surrounds the second region.

21. The method in claim 19, wherein the second region is circular.

22. The method in claim 19, wherein the second region has substantially no chromophores.

23. The method in claim 19, wherein the step of applying an ophthalmic lens comprises implanting an intraocular lens in the eye.

24. The method in claim 19, wherein the step of applying an ophthalmic lens comprises depositing a contact lens on the eye.

25. The method in claim 19, wherein the step of applying an ophthalmic lens comprises applying a corneal inlay or a corneal onlay to the eye.

26. The method of claim 19, wherein the at least one photochromic region is bounded by inner and outer boundaries, the at least one photochromic region having a non-zero concentration of chromaphores at locations between the boundaries, the non-zero concentration of chromaphores varying as a function of radial position such that the at least one photochromic region transmits more light closer to the optical axis than further from the optical axis.

27. The method of claims 26, wherein the concentration of chromaphores varies continuously as a function of radial position.

* * * * *